(12) United States Patent
Hsueh et al.

(10) Patent No.: US 8,988,388 B2
(45) Date of Patent: Mar. 24, 2015

(54) ELECTRONIC DEVICE AND METHOD FOR SCANNING A TOUCH PANEL THEREOF

(75) Inventors: Yi-Fan Hsueh, Taoyuan County (TW); Te-Mu Chen, Taoyuan County (TW); Pi-Lin Lo, Taoyuan County (TW); Kuang-Hua Lee, Taoyuan County (TW); Cheng-Hsi Liu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 180 days.

(21) Appl. No.: 13/607,800

(22) Filed: Sep. 9, 2012

(65) Prior Publication Data

US 2013/0069909 A1    Mar. 21, 2013

Related U.S. Application Data

(60) Provisional application No. 61/535,377, filed on Sep. 16, 2011.

(51) Int. Cl.
*G06F 3/045* (2006.01)
*G06F 3/041* (2006.01)
*G06F 3/044* (2006.01)

(52) U.S. Cl.
CPC .............. *G06F 3/044* (2013.01); *G06F 3/0418* (2013.01)
USPC .......................................... 345/174; 345/173

(58) Field of Classification Search
CPC ..... G06F 3/041; G06F 3/0412; G06F 3/0414; G06F 3/0416; G06F 3/0418; G06F 3/044; G06F 3/045; G06F 3/047
USPC .................... 345/173, 174, 177–179
See application file for complete search history.

(56) References Cited

U.S. PATENT DOCUMENTS

| | | | |
|---|---|---|---|
| 2007/0070049 A1* | 3/2007 | Lee et al. ....................... | 345/173 |
| 2007/0262966 A1 | 11/2007 | Nishimura et al. | |
| 2010/0253638 A1 | 10/2010 | Yousefpor et al. | |
| 2010/0289769 A1* | 11/2010 | Watanabe ..................... | 345/174 |

(Continued)

FOREIGN PATENT DOCUMENTS

| | | |
|---|---|---|
| CN | 101887335 | 11/2010 |
| JP | H09-274537 | 10/1997 |

(Continued)

OTHER PUBLICATIONS

"Search Report of Europe Counterpart Application", issued on Jan. 8, 2013, p. 1-p. 4.

(Continued)

*Primary Examiner* — Dwayne Bost
*Assistant Examiner* — Stefan M Oehrlein
(74) *Attorney, Agent, or Firm* — Jianq Chyun IP Office (57) ABSTRACT

An electronic device and a method for scanning a touch panel of the electronic device are provided. The electronic device includes a touch panel and a control circuitry. The touch panel includes a plurality of touch sensors. The control circuitry is coupled to the touch panel. The control circuitry charges each of the touch sensors according to a preset charge period of the touch sensor and detects the maximum difference in charge characteristics of the touch sensors. The control circuitry adjusts the preset charge periods of the touch sensors according to the charge characteristics of the touch sensors and a preset limit of the preset charge periods of the touch sensors when the maximum difference is higher than a preset threshold.

21 Claims, 12 Drawing Sheets

(56) References Cited

U.S. PATENT DOCUMENTS

| | | | |
|---|---|---|---|
| 2011/0063993 A1 | 3/2011 | Wilson et al. | |
| 2011/0067933 A1 | 3/2011 | Chang et al. | |
| 2011/0073384 A1* | 3/2011 | Osoinach et al. | 178/18.06 |
| 2011/0109585 A1 | 5/2011 | Kwon et al. | |
| 2011/0147101 A1 | 6/2011 | Bateman et al. | |
| 2011/0157077 A1* | 6/2011 | Martin et al. | 345/174 |
| 2011/0248937 A1 | 10/2011 | Suzuki | |
| 2012/0050229 A1* | 3/2012 | Tenuta et al. | 345/178 |

FOREIGN PATENT DOCUMENTS

| | | |
|---|---|---|
| JP | 2001166882 | 6/2001 |
| JP | 2009-223884 | 10/2009 |
| JP | 2010-267093 | 11/2010 |
| JP | 2011-060021 | 3/2011 |
| TW | 200712997 | 4/2007 |
| TW | 200915162 | 4/2009 |
| TW | M363639 | 8/2009 |
| TW | 201120720 | 6/2011 |
| WO | 2011088726 | 7/2011 |

OTHER PUBLICATIONS

"Office Action of Europe Counterpart Application", issued on Jan. 18, 2013, p. 1-p. 6.

"Notice of Grant of Japan Counterpart Application", issued on Jan. 7, 2014, p. 1-p. 3.

"Office Action of Taiwan Counterpart Application", issued on Jul. 11, 2014, p. 1-p. 8.

"Office Action of Taiwan Counterpart Application", issued on Jul. 11, 2014, p. 1-p. 21.

"Office Action of co-pending U.S. Appl. No. 13/615,588", issued on May 22, 2014, p. 1-p. 54.

"Office Action of Taiwan Counterpart Application", issued on Jul. 10, 2014, p. 1-p. 3.

* cited by examiner

FIG. 12

ELECTRONIC DEVICE AND METHOD FOR SCANNING A TOUCH PANEL THEREOF

CROSS-REFERENCE TO RELATED APPLICATION

This application claims the priority benefits of U.S. provisional application Ser. No. 61/535,377, filed on Sep. 16, 2011. The entirety of the above-mentioned patent application is hereby incorporated by reference herein and made a part of this specification.

BACKGROUND OF THE INVENTION

1. Field of the Invention

The present invention relates to an electronic device and a method for scanning a touch panel thereof. More particularly, the present invention relates to charging the touch sensors of the touch panel in the aforementioned scanning.

2. Description of the Related Art

Figure 1:
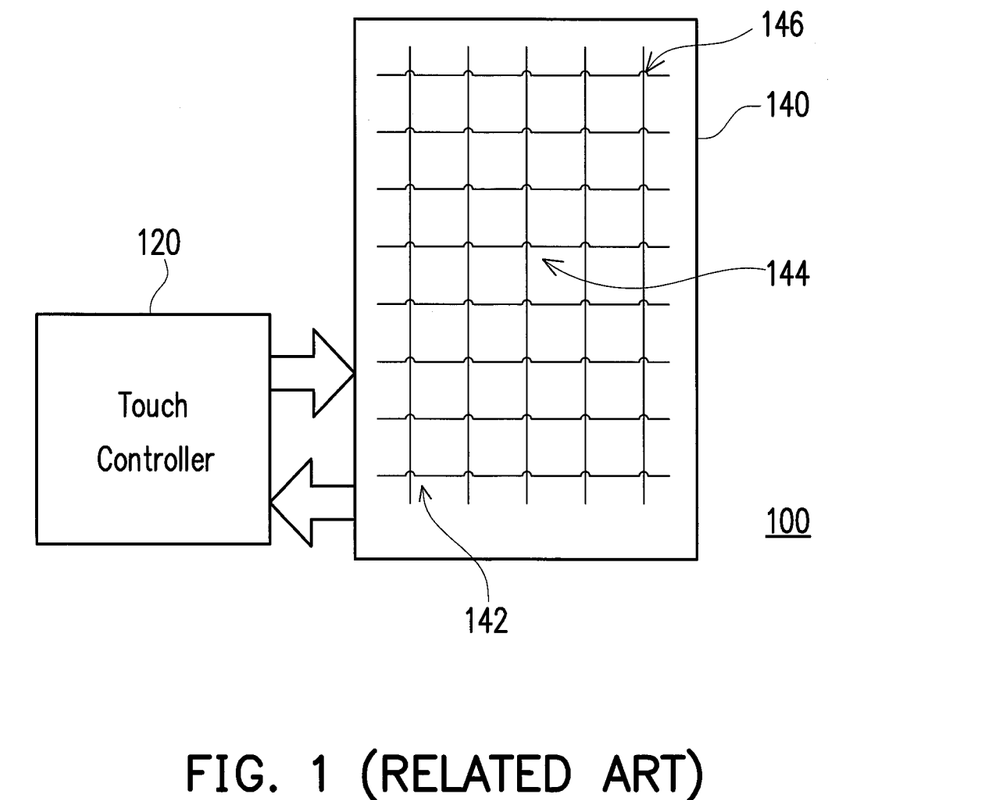
FIG. 1 is a schematic diagram showing a conventional electronic device with a touch panel.

FIG. 1 is a schematic diagram showing a conventional electronic device 100 including a touch controller 120 and a touch panel 140, which is a capacitive touch panel. The touch panel 140 includes a set of driving lines (the vertical lines) and a set of sensing lines (the horizontal lines). Each location where a driving line crosses a sensing line is a touch sensor of the touch panel 140. For example, three touch sensors of the touch panel 140 are marked as 142, 144 and 146, respectively.

When a user performs some operations on the touch panel 140, the touch controller 120 can detect resultant touch events by scanning the touch panel 140. For scanning of the touch panel 140, the touch controller 120 sends driving signals to the driving lines of the touch panel 140. The driving signals charges the touch sensors of the touch panel 140 and the touch sensors generate sensing signals in response. Next, the touch controller 120 receives the sensing signals from the sensing lines of the touch panel 140. The touch controller 120 analyzes the sensing signals to determine the locations of the touch events. The electronic device 100 may perform predetermined functions according to the touch events.

In the scanning of a touch panel, noises often affect the sensing signals and cause erroneous results of the detection of touch events. The noise is always a problem. For example, many electronic devices, such as smart phones and tablet computers, are equipped with touch displays that consist of touch panels and liquid crystal modules (LCMs). An LCM generates a lot of noises when the polarities of its pixels are inverted.

Figure 2:
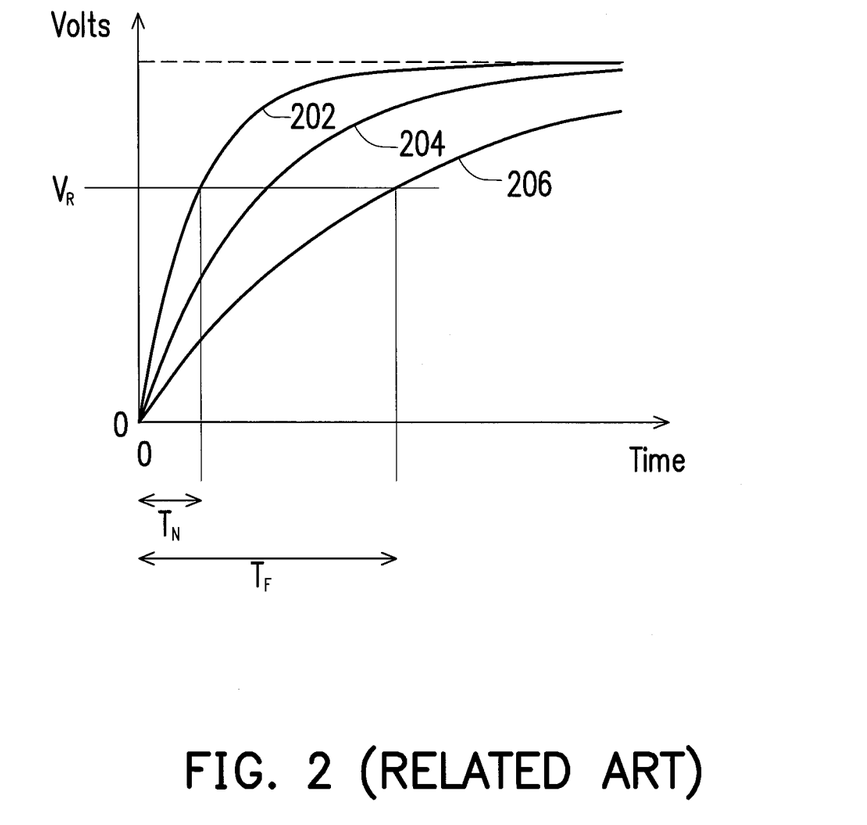
FIG. 2 is a schematic diagram showing the charging of the touch sensors of a conventional touch panel.

Another conventional problem is the different charge times of the touch sensors of a touch panel. The equivalent resistances and equivalent capacitances of the touch sensors of a touch panel are not uniform, which means the charge characteristics of the touch sensors are not uniform, either. FIG. 2 is a schematic diagram showing the curves 202, 204 and 206 of the voltage-time characteristics of the charging of the touch sensors 142, 144 and 146 of the conventional touch panel 140, respectively. As shown in FIG. 2, a far-end touch sensor such as the touch sensor 146 charges slower than a near-end touch sensor such as the touch sensor 142 charges because the far-end touch sensor has a larger time constant. Here the time constant of a touch sensor is the product of the equivalent resistance and the equivalent capacitance of the touch sensor. Ideally, in the scanning of the touch panel 140, all touch sensors are required to charge to the voltage level $V_R$. The near-end touch sensor 142 takes a period $T_N$ to charge to the voltage level $V_R$, while the far-end touch sensor 146 takes a much longer period $T_F$ to charge to the voltage level $V_R$.

However, the touch sensors of a conventional touch panel are all charged according to the same charge period, which might cause undercharge or overcharge of the touch sensors. For example, the touch sensors 144 and 146 are undercharged when all the touch sensors are charged according to the charge period $T_N$, while the touch sensors 142 and 144 are overcharged when all the touch sensors are charged according to the charge period $T_F$.

SUMMARY OF THE INVENTION

Accordingly, the present invention is directed to an electronic device and a method for scanning a touch panel of the electronic device. The electronic device and the method can solve or alleviate the aforementioned noise problem and charge problem.

According to an embodiment of the present invention, an electronic device is provided. The electronic device includes a touch panel and a control circuitry. The touch panel includes a plurality of touch sensors. The control circuitry is coupled to the touch panel. The control circuitry charges each of the touch sensors according to a preset charge period of the touch sensor and detects the maximum difference in charge characteristics of the touch sensors. The control circuitry adjusts the preset charge periods of the touch sensors according to the charge characteristics of the touch sensors and a preset limit of the preset charge periods of the touch sensors when the maximum difference is higher than a preset threshold.

According to another embodiment of the present invention, an electronic device is provided. The electronic device includes a display and a control circuitry. The display is integrated with a plurality of touch sensors. The display may be liquid crystal display, OLED (organic light emitting) display, in-cell, on-cell display or transparent OLED display. The control circuitry is coupled to the touch panel. The control circuitry charges each of the touch sensors according to a preset charge period of the touch sensor and detects the maximum difference in charge characteristics of the touch sensors. The control circuitry adjusts the preset charge periods of the touch sensors according to the charge characteristics of the touch sensors and a preset limit of the preset charge periods of the touch sensors when the maximum difference is higher than a preset threshold.

According to another embodiment of the present invention, a method for scanning a touch panel of the aforementioned electronic device is provided. The method includes the following steps. Charge each touch sensor of the touch panel according to the preset charge period of each touch sensor. Detect the maximum difference in charge characteristics of the touch sensors of the touch panel. Adjust the preset charge periods of the touch sensors according to the charge characteristics of the touch sensors and a preset limit of the preset charge periods of the touch sensors when the maximum difference is higher than a preset threshold.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 3:
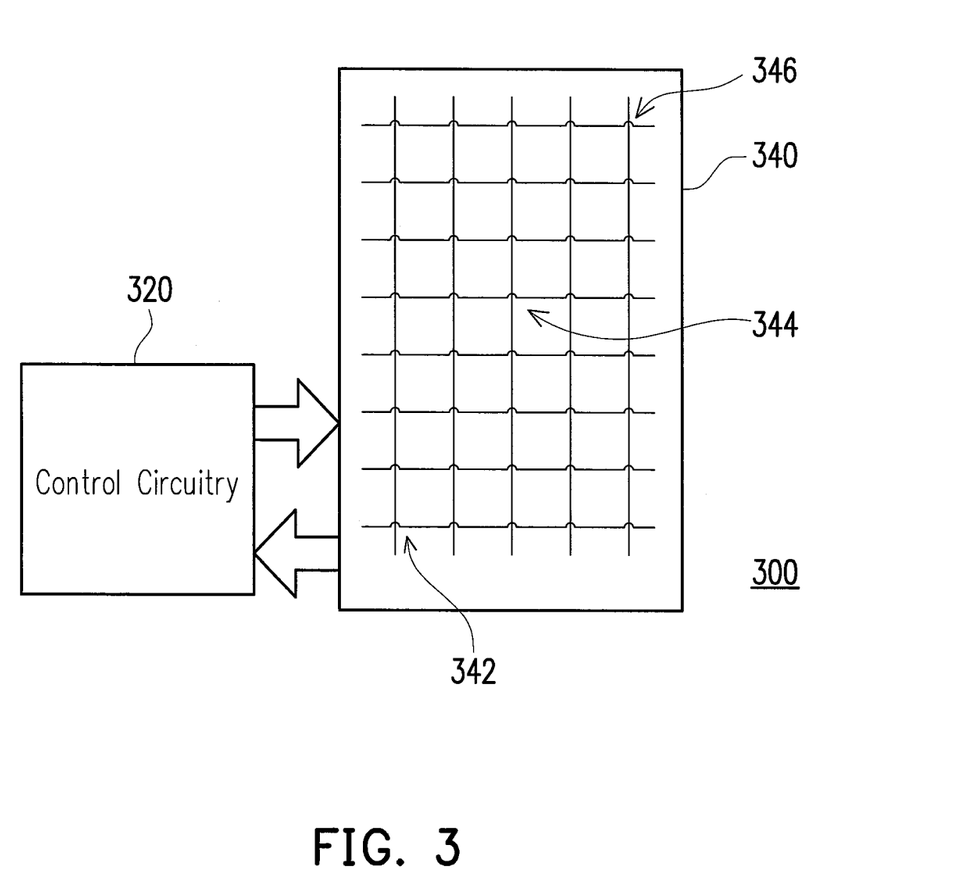
FIG. 3 is a schematic diagram showing an electronic device according to an embodiment of the present invention.

FIG. 3 is a schematic diagram showing an electronic device 300 according to an embodiment of the present invention. The electronic device 300 may be a smart phone, a personal digital assistant, a tablet computer or a notebook computer. The electronic device 300 includes a touch panel 340 and a control circuitry 320 coupled to the touch panel 340. The touch panel 340 may be a capacitive touch panel that includes a plurality of touch sensors for sensing touch events, such as the touch sensors 342, 344 and 346. The control circuitry 320 may detect touch events by scanning the touch panel 340. The control circuitry 320 scans the touch panel 340 by sending driving signals to the touch panel 340 to charge the touch sensors and then receiving and analyzing the sensing signals from the touch panel 340. The electronic device 300 may execute predetermined functions according to the touch events.

Figure 4:
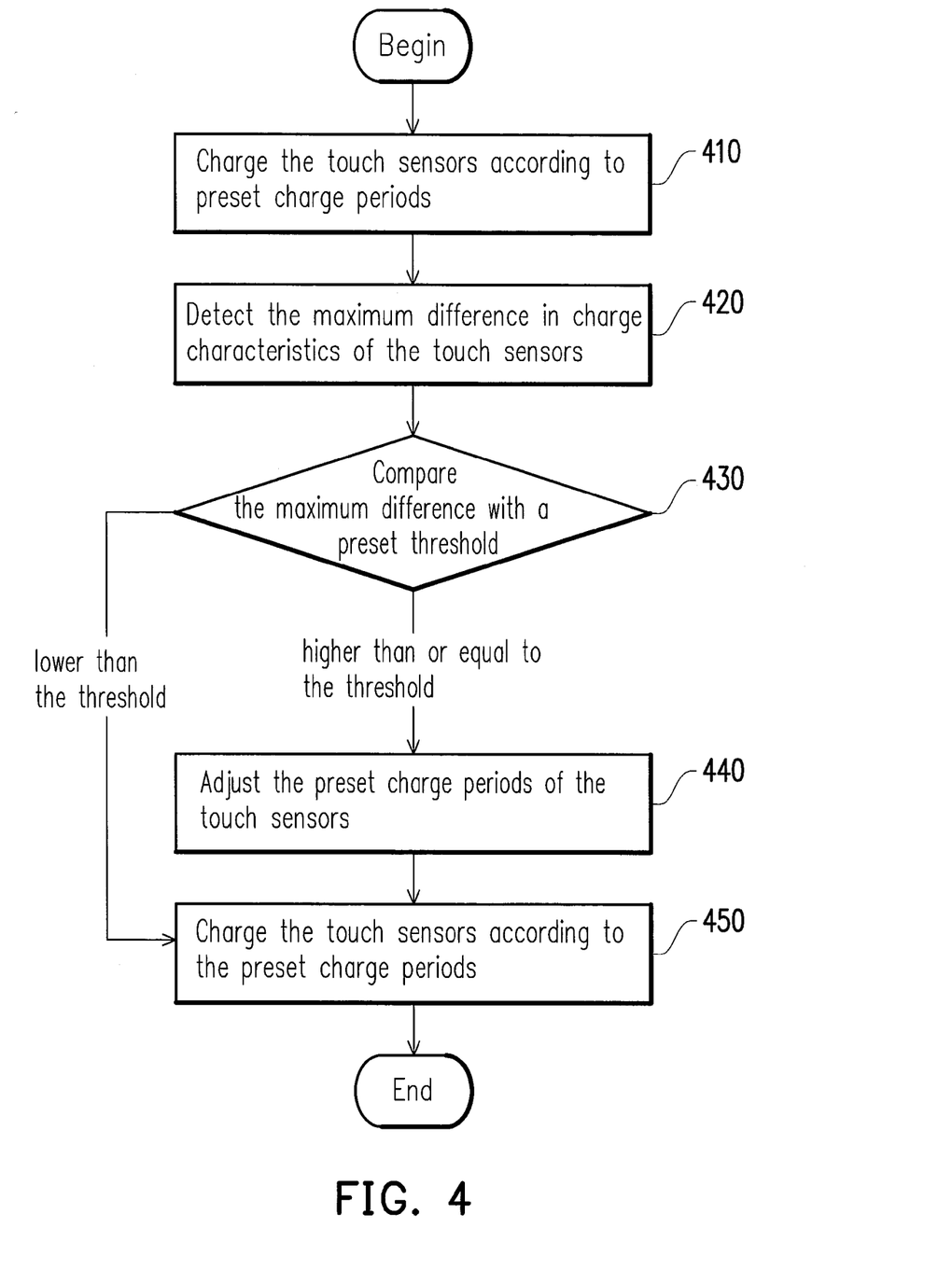
FIG. 4 is a flow chart showing a method for charging a touch panel of an electronic device according to an embodiment of the present invention.

FIG. 4 is a flow chart showing a method for charging a touch panel of an electronic device according to an embodiment of the present invention. The method may be executed by the control circuitry 320 on the touch panel 340. The method may also be executed by another similar control circuitry on another similar touch panel.

The flow shown in FIG. 4 is discussed below. In step 410, charge some or all of the touch sensors of the touch panel. Each touch sensor is charged according to a preset charge period of the touch sensor. Here the preset charge period is the length of time for which a touch sensor is charged. When step 410 is executed for the first time, the preset charge period of each touch sensor is the same default value. When step 410 is executed later, the preset charge period of each touch sensor may be a value which was determined when the method in FIG. 4 was executed previously and the preset charge periods of the touch sensors may be the same or different.

In step 420, detect charge characteristics of the touch sensors and detect the maximum difference in charge characteristics of the touch sensors. In this embodiment, the charge characteristic of each touch sensor may be the voltage level to which the touch sensor is charged in the preset charge period of the touch sensor. Alternatively, the charge characteristic of each touch sensor may be the time constant of the touch sensor. In step 430, compare the maximum difference in the charge characteristics of the touch sensors with a preset threshold.

When the maximum difference is lower than the preset threshold, the flow proceeds to step 450. The control circuitry keeps the preset charge periods of the touch sensors unchanged and the control circuitry charge each touch sensor according to the preset charge period of the touch sensor. Since the maximum difference in the charge characteristics of the touch sensors is lower than the preset threshold, the conventional problem of non-uniform charge does not exist in this case.

When the maximum difference in the charge characteristics of the touch sensors is higher than or equal to the preset threshold, the flow proceeds to step 440 to adjust the preset charge periods of the touch sensors according to the charge characteristics of the touch sensors and a preset limit $T_L$ of the preset charge periods of the touch sensors. A purpose of the adjustment in step 440 is determining the preset charge period of each touch sensor to unify the voltage level to which each touch sensor is charged in order to avoid the conventional problem of non-uniform charge. Another purpose of the adjustment in step 440 is limiting the lengths of the preset charge periods of the touch sensors in order to avoid the interference of noises. The preset charge periods determined in step 440 may be stored in a table to be used later. Next, in step 450, the control circuitry charges each touch sensor according to the preset charge period of the touch sensor determined in step 440.

The longer the charge period of a touch sensor, the more noises might appear during the charge period. Therefore, there is a preset limit $T_L$ of the preset charge periods of the touch sensors in this embodiment. The preset charge period of each touch sensor must be shorter than or equal to the preset limit $T_L$. In step 440, the control circuitry first determines the length of the preset charge period of the slowest touch sensor with the largest time constant among the touch sensors according to the preset limit $T_L$. The control circuitry sets the length of the preset charge period of the slowest touch sensor to be the time the slowest touch sensor takes to be fully charged to the ideal voltage level $V_I$ when the slowest touch sensor can be fully charged to $V_I$ in the preset limit $T_L$. Alternatively, the control circuitry sets the length of the preset charge period of the slowest touch sensor to be the preset limit $T_L$ when the slowest touch sensor cannot be fully charged in the preset limit $T_L$. The ideal voltage level $V_I$ is the voltage level to which each touch sensor should be charged for the scanning of the touch panel. A partially charged touch sensor can still detect touch events as long as the voltage level to which the touch sensor is charged is not too much lower than the ideal voltage level $V_I$.

Figure 5:
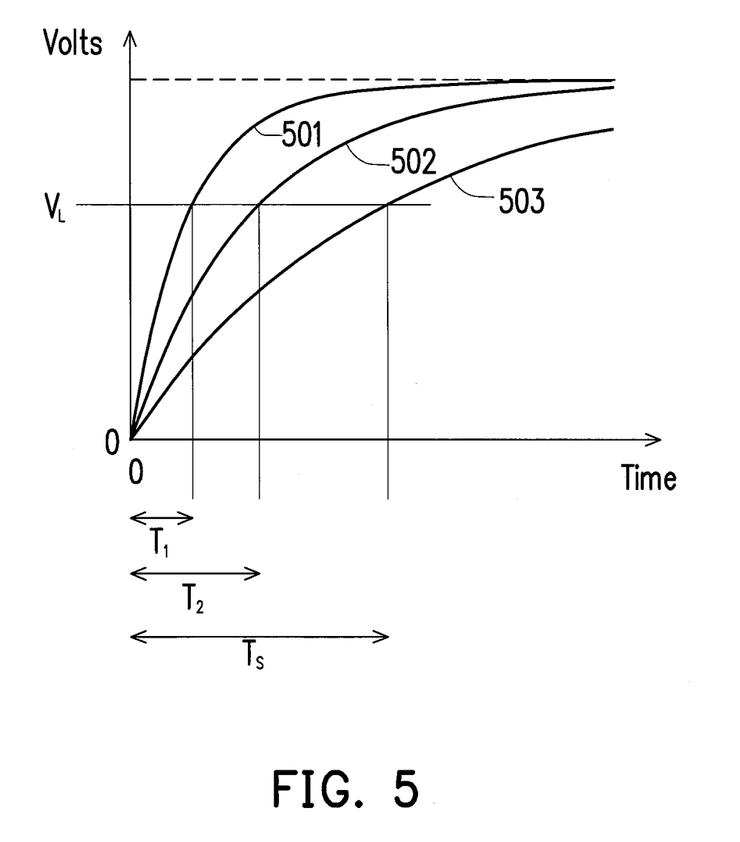
FIG. 5 is a schematic diagram showing the charging of the touch sensors of a touch panel according to an embodiment of the present invention.

Next, the control circuitry determines the lengths of the preset charge periods of the other touch sensors according to the length of the preset charge period of the slowest touch sensor and the charge characteristics of the other touch sensors. For example, please refer to FIG. 5. FIG. 5 is a schematic diagram showing the charging of three touch sensors of a touch panel according to an embodiment of the present invention. The curves 501-503 show the voltage-time characteristics of the charging of the three touch sensors, respectively. The slowest touch sensor with the largest time constant is corresponding to the curve 503.

Assume the slowest touch sensor is charged to the voltage level $V_L$ in its preset charge period determined according to the preset limit $T_L$ in the aforementioned manner $V_L$ may be lower than or equal to the ideal voltage level $V_I$. The control circuitry may set the length of the preset charge period of each of the other touch sensors to be the time the touch sensor takes to be charged to the same voltage level $V_L$. As shown in FIG. 5, the slowest touch sensor takes a period of time $T_S$ to charge to the voltage level $V_L$. The other two touch sensors take the periods of time $T_1$ and $T_2$ to charge to the voltage level $V_L$, respectively. Therefore, the control circuitry sets the lengths of the preset charge periods of the other two touch sensors to be $T_1$ and $T_2$, respectively. The control circuitry may detect the voltage level $V_L$ by charging the slowest touch sensor or calculate the voltage level $V_L$ according to the charge characteristic of the slowest touch sensor. The control circuitry may detect the lengths of $T_1$ and $T_2$ by charging the other two touch sensors or calculate the lengths of $T_1$ and $T_2$ according to the voltage level $V_L$ and the charge characteristics of the other two touch sensors.

Figure 6:
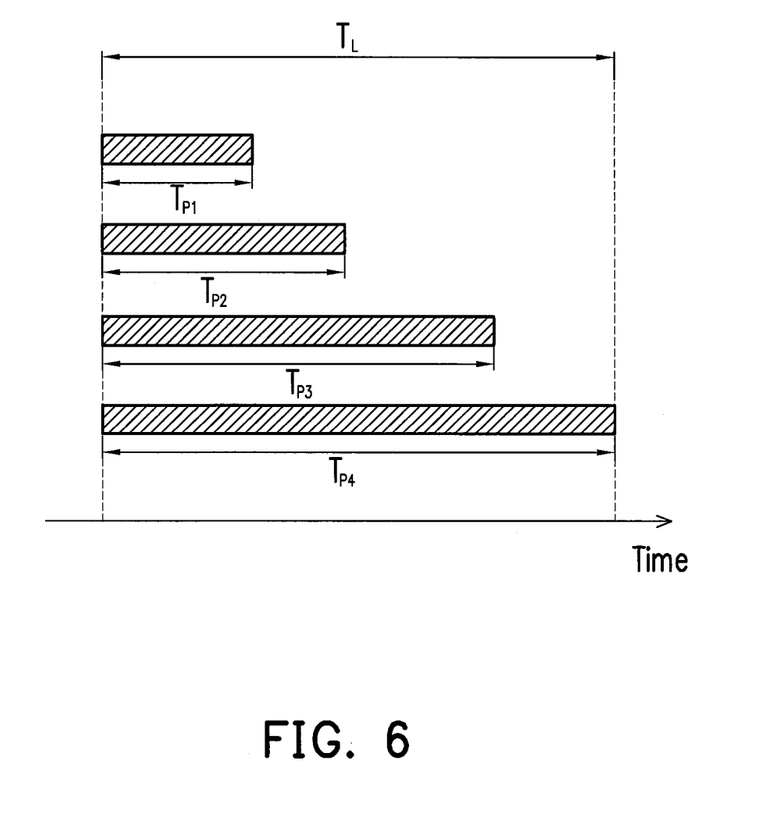
FIG. 6 is a schematic diagram showing the preset charge periods of the touch sensors of a touch panel according to an embodiment of the present invention.

FIG. 6 is a schematic diagram showing the preset charge periods of four touch sensors of a touch panel according to an embodiment of the present invention. In FIG. 6, $T_L$ is the preset limit of the preset charge periods of the touch sensors. $T_{P1}$, $T_{P2}$, $T_{P3}$ and $T_{P4}$ are the preset charge periods of the four touch sensors determined by the control circuitry in step 440 in the aforementioned manner, respectively. As shown in FIG. 6, the touch sensors begin charging at the same moment and end charging at different moments. The charging of the fastest touch sensor with the smallest time constant ends first. The preset charge periods $T_{P1}$, $T_{P2}$, $T_{P3}$ and $T_{P4}$ of the touch sensors span no longer than the preset limit $T_L$.

Figure 7:
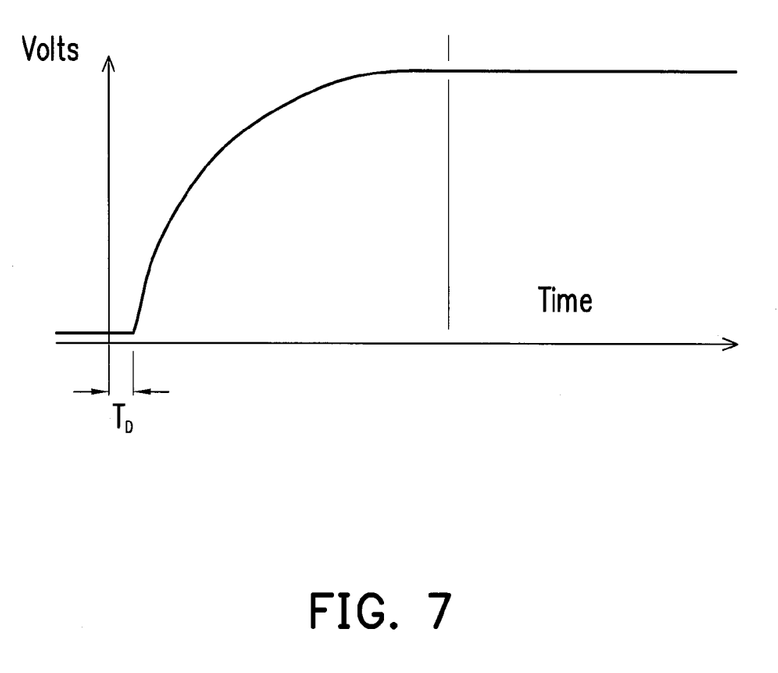
FIG. 7 is a schematic diagram showing the preset charge delay of a touch sensor of a touch panel according to an embodiment of the present invention.

In some other embodiments of the present invention, the control circuitry may determine not only the preset charge periods of the touch sensors but also the preset charge delays of the touch sensors. FIG. 7 is a schematic diagram showing the preset charge delay of a touch sensor of a touch panel according to an embodiment of the present invention. $T_D$ is the preset charge delay of the touch sensor. As shown in FIG. 7, the touch sensor does not charge until its preset charge delay $T_D$ expires.

When the preset charge delays are involved, the method shown in FIG. 4 needs the following modification. In steps 410 and 450, the control circuitry charges each of the touch sensors according to the preset charge period and the preset charge delay of the touch sensor. When the maximum difference is lower than the preset threshold in step 430, the control circuitry keeps the preset charge periods and the preset charge delays of the touch sensors unchanged. When the maximum difference is higher than or equal to the preset threshold in step 430, the control circuitry adjusts the preset charge periods and the preset charge delays of the touch sensors according to the charge characteristics of the touch sensors and the preset limit $T_L$ in step 440.

Figure 8:
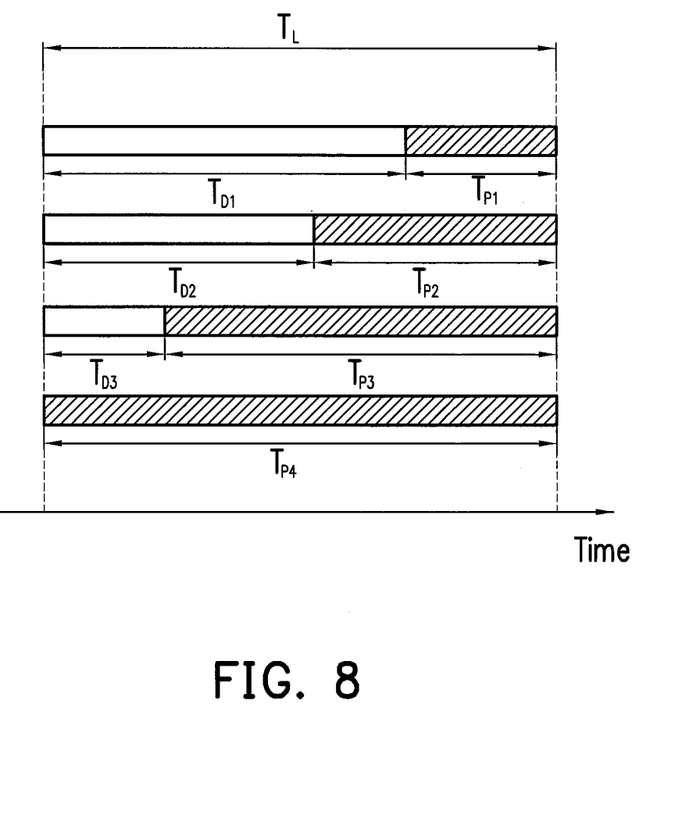
FIG. 8 is a schematic diagram showing the preset charge periods and the preset charge delays of the touch sensors of a touch panel according to an embodiment of the present invention.

For example, FIG. 8 is a schematic diagram showing the preset charge periods and the preset charge delays of four touch sensors of a touch panel according to an embodiment of the present invention. In FIG. 8, $T_L$ is the preset limit of the preset charge periods of the touch sensors. $T_{P1}$, $T_{P2}$, $T_{P3}$ and $T_{P4}$ are the preset charge periods of the four touch sensors determined by the control circuitry in step 440 in the aforementioned manner, respectively. $T_{D1}$, $T_{D2}$ and $T_{D3}$ are the preset charge delays of three of the four touch sensors determined by the control circuitry in step 440, respectively. The preset charge delay of the slowest touch sensor with the largest time constant is zero. As shown in FIG. 8, the touch sensors begin charging at different moments and end charging at the same moment. The charging of the fastest touch sensor with the smallest time constant begins last. The preset charge periods $T_{P1}$, $T_{P2}$, $T_{P3}$ and $T_{P4}$ of the touch sensors span no longer than the preset limit $T_L$. The example in FIG. 6 may be considered as a special case of the example in FIG. 8 in which the preset charge delays are all zero. The control circuitry may arrange the preset charge delays of the touch sensors arbitrarily as long as the preset charge periods of the touch sensors span no longer than the preset limit $T_L$.

Figure 9:
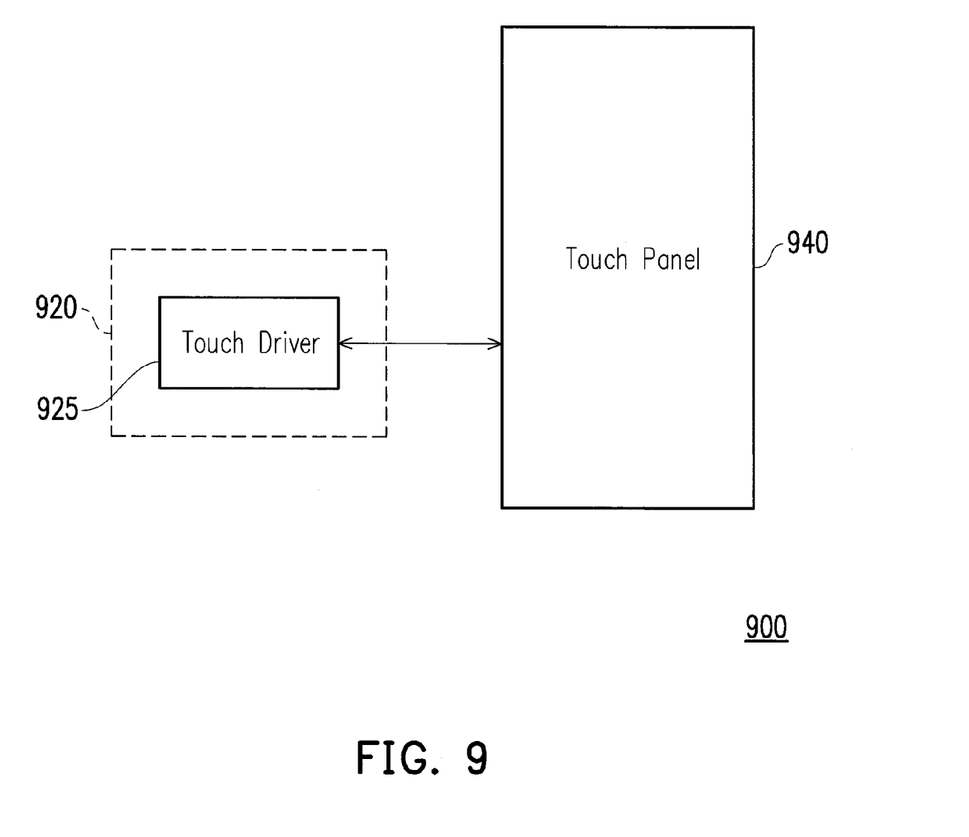
FIGS. 9-12 are schematic diagrams showing electronic devices according to some embodiments of the present invention.

FIG. 9 is a schematic diagram showing an electronic device 900 according to an embodiment of the present invention. The electronic device 900 includes a touch panel 940 and a control circuitry 920. The control circuitry 920 includes a touch driver 925. The touch driver 925 may execute the method for scanning a touch panel discussed above on the touch panel 940.

Figure 10:
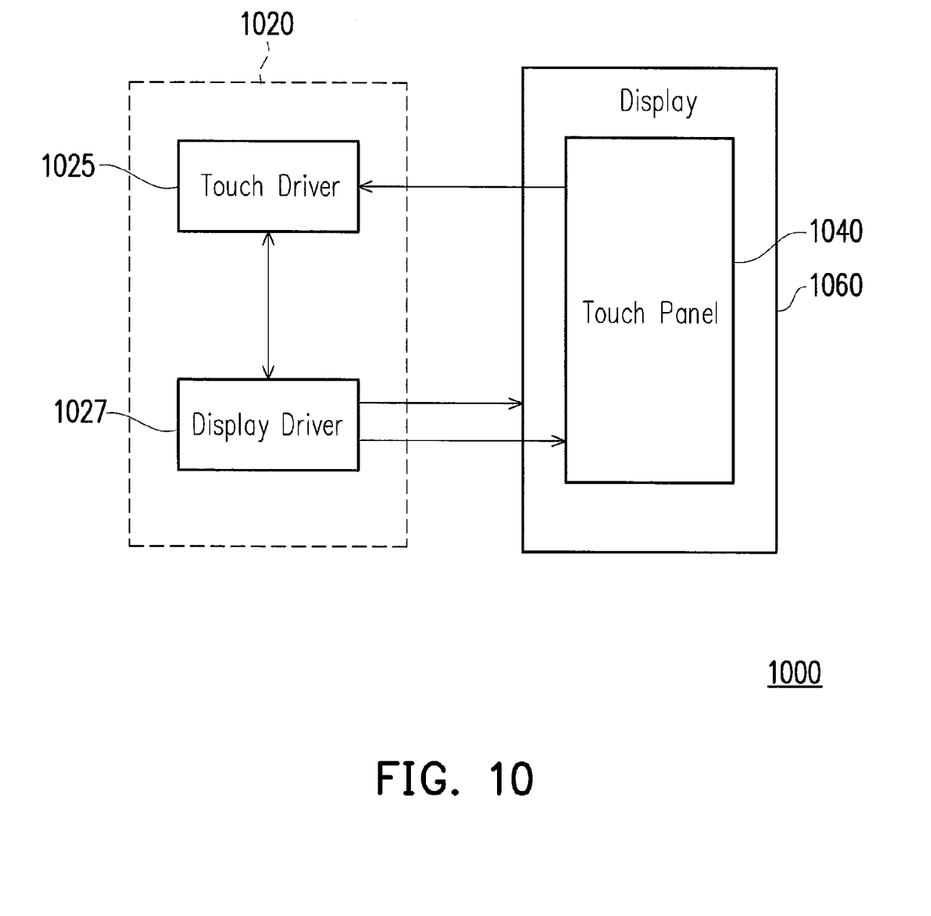

FIG. 10 is a schematic diagram showing an electronic device 1000 according to another embodiment of the present invention. The electronic device 1000 includes a touch panel 1040, an display 1060 and a control circuitry 1020. The touch panel 1040 includes a plurality of touch sensors. The touch panel 1040 is integrated as a part of the display 1060. For example, the conductive layers of the touch panel 1040 may be fabricated among the layers of the display 1060. The control circuitry 1020 includes a touch driver 1025 and a display driver 1027. The display driver 1027 drives the pixels of the display 1060 to display images, such as the graphical user interfaces of the electronic device 1000.

The touch driver 1025 and the display driver 1027 cooperate to execute the method for scanning a touch panel discussed above on the touch panel 1040. The display driver 1027 executes steps 410 and 450. The display driver 1027 sends driving signals to the touch panel 1040 to charge the touch sensors and the touch driver 1025 receives the resultant sensing signals from the touch panel 1040. The touch driver 1025 may decide when to charge the touch sensors and send a control signal to inform the display driver 1027 to begin sending the driving signals to the touch sensors. Alternatively, the display driver 1027 may decide when to charge the touch sensors and send a control signal to inform the touch driver 1025 to receive the sensing signals from the touch sensors.

The touch driver 1025 executes step 420. The touch driver 1025 or the display driver 1027 may execute step 430. The touch driver 1025 or the display driver 1027 may execute step 440 to determine the preset charge periods (or both the preset charge periods and the preset charge delays) of the touch sensors of the touch panel 1040. When the preset charge periods (or both the preset charge periods and the preset charge delays) of the touch sensors are determined by the touch driver 1025, the touch driver 1025 sends a control signal to inform the display driver 1027 of the preset charge periods (or both the preset charge periods and the preset charge delays) of the touch sensors. When the preset charge periods (or both the preset charge periods and the preset charge delays) of the touch sensors are determined by the display driver 1027, the touch driver 1025 sends a control signal to inform the display driver 1027 of the necessary data, such as the charge characteristics of the touch sensors.

Figure 11:
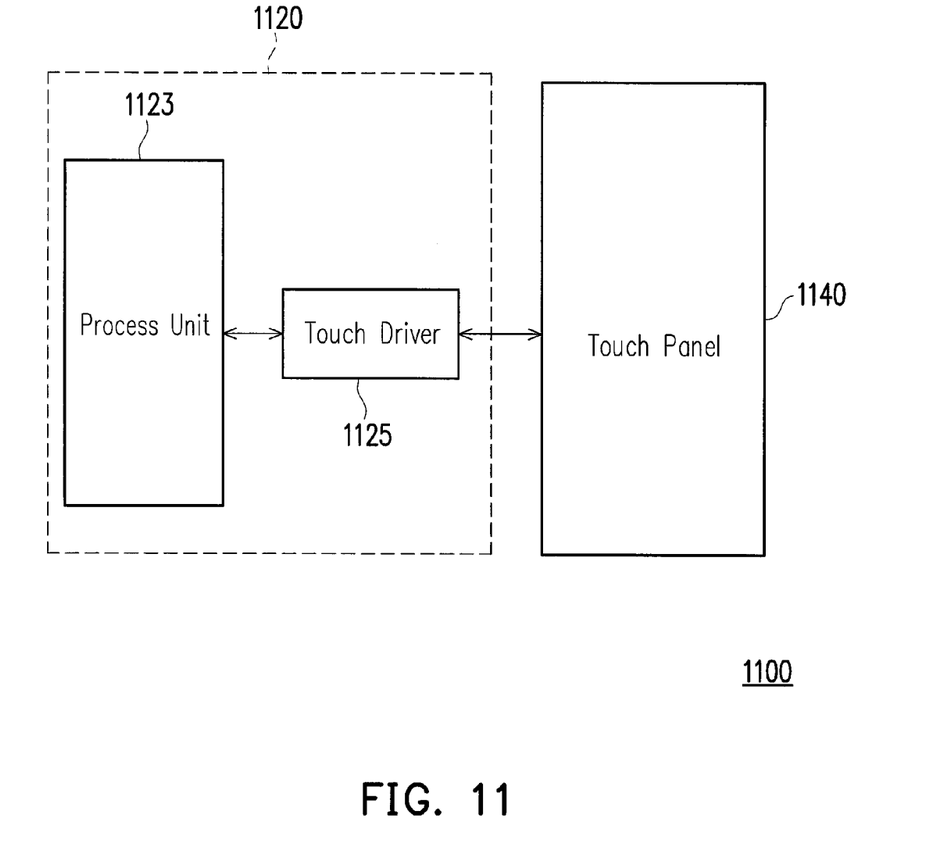

FIG. 11 is a schematic diagram showing an electronic device 1100 according to another embodiment of the present invention. The electronic device 1100 includes a touch panel 1140 and a control circuitry 1120. The control circuitry 1120 includes a process unit 1123 and a touch driver 1125. The process unit 1123 is the main system of the electronic device 1100. The process unit 1123 and the touch driver 1125 cooperate to execute the method for scanning a touch panel discussed above on the touch panel 1140. The process unit 1123 executes predetermined functions of the electronic device 1100 according to the detected touch events. The touch driver 1125 executes steps 410, 420 and 450. The process unit 1123 executes step 440 to determine the preset charge periods (or both the preset charge periods and the preset charge delays) of the touch sensors of the touch panel 1140. The process unit 1123 or the touch driver 1125 executes step 430.

Figure 12:
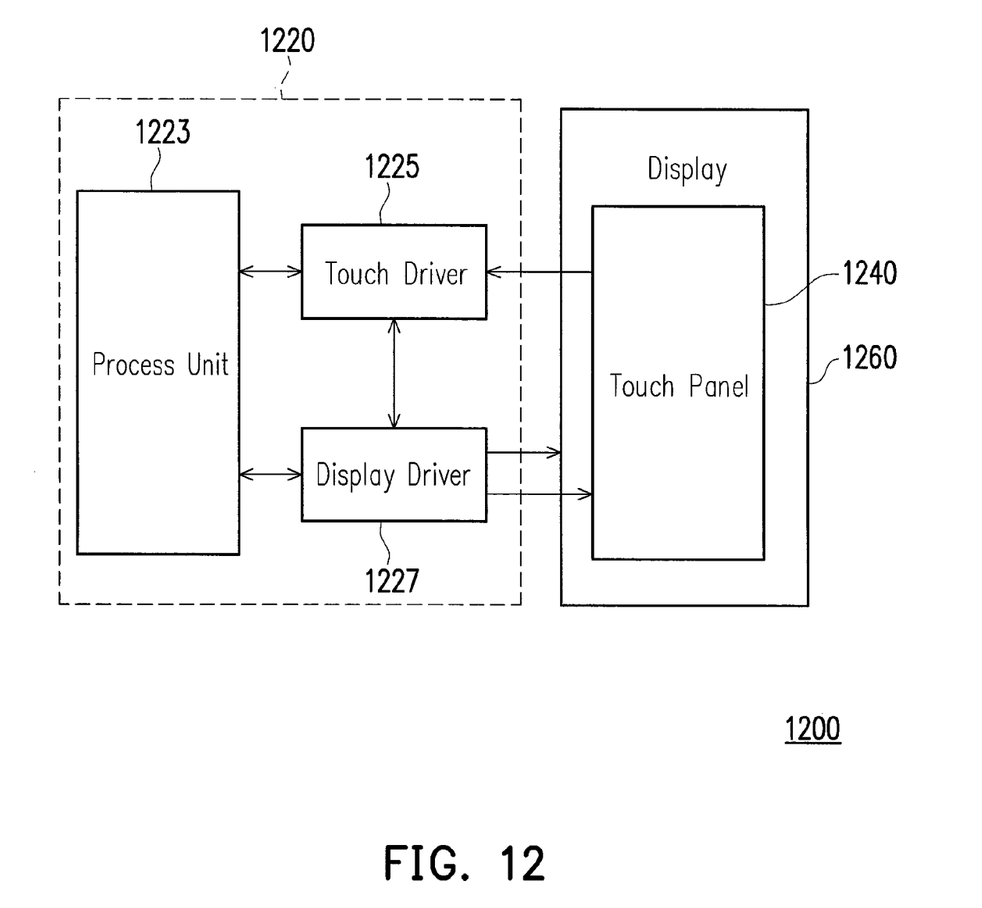

FIG. 12 is a schematic diagram showing an electronic device 1200 according to another embodiment of the present invention. The electronic device 1200 includes a touch panel 1240, an display 1260 and a control circuitry 1220. The touch panel 1240 is integrated as a part of the display 1260. The control circuitry 1220 includes a system 1223, a touch driver 1225 and a display driver 1227. The system 1223 is the main system of the electronic device 1200. The display driver 1227 drives the pixels of the display 1260 to display images, such as the graphical user interfaces of the electronic device 1200.

The system 1223, the touch driver 1225 and the display driver 1227 cooperate to execute the method for scanning a touch panel discussed above on the touch panel 1240. The system 1223 executes predetermined functions of the electronic device 1200 according to the detected touch events. The display driver 1227 executes steps 410 and 450. The display driver 1227 sends driving signals to the touch panel 1240 to charge the touch sensors and the touch driver 1225 receives the resultant sensing signals from the touch panel 1240. The touch driver 1225 or the display driver 1227 may decide when to charge the touch sensors.

The touch driver 1225 executes step 420. The system 1223, the touch driver 1225 or the display driver 1227 may execute step 430. The system 1223 executes step 440 to determine the preset charge periods (or both the preset charge periods and the preset charge delays) of the touch sensors of the touch panel 1240.

All of the systems, the touch drivers and the display drivers in FIGS. 9-12 are hardware circuits.

In summary, the present invention sets difference charge periods (or different charge periods and different charge delays) for the touch sensors of a touch panel in order to prevent the conventional problem of non-uniform charge of the touch sensors. In addition, the present invention imposes a preset limit on the preset charge periods of the touch sensors in order to avoid or alleviate the interference of noises during the scanning of a touch panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising: a touch panel, comprising a plurality of touch sensors; and a control circuitry, coupled to the touch panel, wherein the control circuitry charges each of the touch sensors according to a preset charge period of the touch sensor and detects a maximum difference in charge characteristics of the touch sensors, the control circuitry adjusts the preset charge periods of the touch sensors according to the charge characteristics of the touch sensors and a preset limit of the preset charge periods of the touch sensors when the maximum difference is higher than a preset threshold, wherein when the control circuitry adjusts the preset charge periods of the touch sensors, the control circuitry determines a length of the preset charge period of a slowest touch sensor with a largest time constant among the touch sensors according to the preset limit, and the control circuitry determines lengths of the preset charge periods of the other touch sensors according to the length of the preset charge period of the slowest touch sensor and the charge characteristics of the other touch sensors.

2. The electronic device of claim 1, wherein the charge characteristic of each of the touch sensors is a voltage level to which the touch sensor is charged in the preset charge period of the touch sensor or a time constant of the touch sensor.

3. The electronic device of claim 1, wherein the control circuitry keeps the preset charge periods of the touch sensors unchanged and charges each of the touch sensors according to the preset charge period of the touch sensor when the maximum difference is lower than the preset threshold.

4. The electronic device of claim 1, wherein the control circuitry sets the length of the preset charge period of the slowest touch sensor to be a time the slowest touch sensor takes to be fully charged when the slowest touch sensor can be fully charged in the preset limit, the control circuitry sets the length of the preset charge period of the slowest touch sensor to be the preset limit when the slowest touch sensor cannot be fully charged in the preset limit, the control circuitry sets the length of the preset charge period of each of the other touch sensors to be a time the touch sensor takes to be charged to a same voltage level to which the slowest touch sensor is charged in the preset charge period of the slowest touch sensor according to the charge characteristic of the touch sensor.

5. The electronic device of claim 1, wherein the control circuitry charges each of the touch sensors according to the preset charge period and a preset charge delay of the touch sensor and detects a maximum difference in the charge characteristics of the touch sensors, the control circuitry adjusts the preset charge periods and the preset charge delays of the touch sensors according to the charge characteristics of the touch sensors and the preset limit when the maximum difference is higher than the preset threshold.

6. The electronic device of claim 5, wherein the control circuitry determines the preset charge delays of the touch sensors such that the preset charge periods of the touch sensors span no longer than the preset limit.

7. The electronic device of claim 5, wherein the control circuitry keeps the preset charge periods and the preset charge delays of the touch sensors unchanged and charges each of the touch sensors according to the preset charge period and the preset charge delay of the touch sensor when the maximum difference is lower than the preset threshold.

8. An electronic device, comprising: a display with integrated touch sensors; and a control circuitry, coupled to the touch panel, wherein the control circuitry charges each of the touch sensors according to a preset charge period of the touch sensor and detects a maximum difference in charge characteristics of the touch sensors, the control circuitry adjusts the preset charge periods of the touch sensors according to the charge characteristics of the touch sensors and a preset limit of the preset charge periods of the touch sensors when the maximum difference is higher than a preset threshold, wherein when the control circuitry adjusts the preset charge periods of the touch sensors, the control circuitry determines a length of the preset charge period of a slowest touch sensor with a largest time constant among the touch sensors according to the preset limit, and the control circuitry determines lengths of the preset charge periods of the other touch sensors according to the length of the preset charge period of the slowest touch sensor and the charge characteristics of the other touch sensors.

9. The electronic device of claim 8, wherein the charge characteristic of each of the touch sensors is a voltage level to which the touch sensor is charged in the preset charge period of the touch sensor or a time constant of the touch sensor.

10. The electronic device of claim 8, wherein the control circuitry keeps the preset charge periods of the touch sensors unchanged and charges each of the touch sensors according to the preset charge period of the touch sensor when the maximum difference is lower than the preset threshold.

11. The electronic device of claim 8, wherein the control circuitry sets the length of the preset charge period of the slowest touch sensor to be a time the slowest touch sensor takes to be fully charged when the slowest touch sensor can be fully charged in the preset limit, the control circuitry sets the length of the preset charge period of the slowest touch sensor to be the preset limit when the slowest touch sensor cannot be fully charged in the preset limit, the control circuitry sets the length of the preset charge period of each of the other touch sensors to be a time the touch sensor takes to be charged to a same voltage level to which the slowest touch sensor is charged in the preset charge period of the slowest touch sensor according to the charge characteristic of the touch sensor.

12. The electronic device of claim 8, wherein the control circuitry charges each of the touch sensors according to the preset charge period and a preset charge delay of the touch sensor and detects a maximum difference in the charge characteristics of the touch sensors, the control circuitry adjusts the preset charge periods and the preset charge delays of the touch sensors according to the charge characteristics of the touch sensors and the preset limit when the maximum difference is higher than the preset threshold.

13. The electronic device of claim 12, wherein the control circuitry determines the preset charge delays of the touch sensors such that the preset charge periods of the touch sensors span no longer than the preset limit.

14. The electronic device of claim 12, wherein the control circuitry keeps the preset charge periods and the preset charge delays of the touch sensors unchanged and charges each of the touch sensors according to the preset charge period and the preset charge delay of the touch sensor when the maximum difference is lower than the preset threshold.

15. A method for scanning a touch panel of an electronic device, comprising: charging each touch sensor of the touch panel according to a preset charge period of the touch sensor; detecting a maximum difference in charge characteristics of the touch sensors of the touch panel; and adjusting the preset charge periods of the touch sensors according to the charge characteristics of the touch sensors and a preset limit of the preset charge periods of the touch sensors when the maximum difference is higher than a preset threshold, wherein the step of adjusting the preset charge periods of the touch sensors comprises: determining a length of the preset charge period of a slowest touch sensor with a largest time constant among the touch sensors according to the preset limit; and determining lengths of the preset charge periods of the other touch sensors according to the length of the preset charge period of the slowest touch sensor and the charge characteristics of the other touch sensors.

16. The method of claim 15, wherein the charge characteristic of each of the touch sensors is a voltage level to which the touch sensor is charged in the preset charge period of the touch sensor or a time constant of the touch sensor.

17. The method of claim 15, further comprising:
keeping the preset charge periods of the touch sensors unchanged and charging each of the touch sensors according to the preset charge period of the touch sensor when the maximum difference is lower than the preset threshold.

18. The method of claim 15, wherein the step of adjusting the preset charge periods of the touch sensors further comprises: setting the length of the preset charge period of the slowest touch sensor to be a time the slowest touch sensor takes to be fully charged when the slowest touch sensor can be fully charged in the preset limit; setting the length of the preset charge period of the slowest touch sensor to be the preset limit when the slowest touch sensor cannot be fully charged in the preset limit; and setting the length of the preset charge period of each of the other touch sensors to be a time the touch sensor takes to be charged to a same voltage level to which the slowest touch sensor is charged in the preset charge period of the slowest touch sensor according to the charge characteristic of the touch sensor.

19. The method of claim 15, further comprising:
charging each of the touch sensors according to the preset charge period and a preset charge delay of the touch sensor; and
adjusting the preset charge periods and the preset charge delays of the touch sensors according to the charge characteristics of the touch sensors and the preset limit when the maximum difference is higher than the preset threshold.

20. The method of claim 19, further comprising:
determining the preset charge delays of the touch sensors such that the preset charge periods of the touch sensors span no longer than the preset limit.

21. The method of claim 19, further comprising:
keeping the preset charge periods and the preset charge delays of the touch sensors unchanged and charging each of the touch sensors according to the preset charge period and the preset charge delay of the touch sensor when the maximum difference is lower than the preset threshold.

* * * * *